United States Patent [19]
Gerull et al.

[11] Patent Number: 5,426,780
[45] Date of Patent: Jun. 20, 1995

[54] SYSTEM FOR DYNAMIC SEGMENTATION ANALYSIS USING CONVERSION OF RELATIONAL DATA INTO OBJECT-ORIENTED DATA

[75] Inventors: Douglas B. Gerull; David M. Glenn, both of Madison, Ala.

[73] Assignee: Intergraph Corporation, Huntsville, Ala.

[21] Appl. No.: 845,337

[22] Filed: Feb. 28, 1992

[51] Int. Cl.$^6$ .............................................. G06F 15/40
[52] U.S. Cl. .................... 395/600; 395/425; 364/974.4; 364/974.5; 364/283.4; 364/419.19; 364/DIG. 2
[58] Field of Search .................. 358/261.1, 261.3; 382/133, 56; 395/600, 425

[56] References Cited

U.S. PATENT DOCUMENTS

| | | | |
|---|---|---|---|
| 4,342,047 | 7/1982 | Niemczyk et al. | 358/80 |
| 4,494,150 | 1/1985 | Brickman et al. | 358/260 |
| 4,633,505 | 12/1986 | Marshall | 382/56 |
| 4,679,094 | 7/1987 | Rutherford et al. | 358/261 |

OTHER PUBLICATIONS

Ranganathan et al., "Effect of Data Compression Hardware on the Performance of a Relational Database Machine", PARBASE-90 International Conference on Databases, Parallel Architectures and Their Applications, 7-9 Mar. 1990, pp. 144-146.

Nelson et al., "A relational Object-oriented management system", Ninth Annual International Phoenix Conference on Computers and Communications, 21-23 Mar. 1990, pp. 319-323.

Jaisimha et al., "Data compression techniques for maps", SOUTHEASTCON '89 Proceedings. Energy and Information Technologies in the Southeast, 9-12 Apr. 1989, pp. 878-883.

Markowitz et al., "Identifying Extended Entity-Relationship Object Structures in Relational Schemas", *IEEE Transactions on Software Engineering*, vol. 16, No. 8, Aug. 1990, pp. 777-790.

Ranganathan, N., *Hardware Algorithms for Data Compression*, Abstract, PhD Dissertation, 1988, University of Central Florida, vol. 49/10-B of *Dissertation Abstracts International*, p. 4413.

Andrews et al., "Combining Languages and Database . . . ", OOPSLA '87 Proceedings, Oct. 4-8, 1987, pp. 430-440.

Fishman et al., "Iris: An Object Oriented Database . . . ", ACM, vol. 5, No. 1, Jan. 1987, pp. 48-69.

Kim et al., "Integrating an Object-Oriented Programming . . . ", OOPSLA '88 Proceedings, Sep. 25-30, 1988, pp. 142-152.

Smith et al., "Intermedia: A Case Study of the . . . ", OOPSLA '87 Proceedings, Oct. 4-8, 1987, pp. 452-465.

Stonebraker, Michael, "Object Management in POSTGRES . . . ", 1986 Int'l Workshop on Object Oriented Database Systems.

IEEE Reprint #THO161-0186/0000/0066, pp. 66-72, Korth & Silberschatz, *Database System Concepts*, McGraw-Hill (New York, 1986), pp. 21-105.

John R. Herring, "TIGRIS: Data Model for an Object-Oriented GIS", *Computers and Geosciences*, vol. 18, No. 4, pp. 443-452, 1992.

John R. Herring, "TIGRIS: Topologically & Integrated Geographic Info. Syst.", Proc. Autocarto 8, HSPRS/ACSM Baltimore, Md., pp. 443-452, 1992.

*Primary Examiner*—Thomas G. Black
*Assistant Examiner*—Paul R. Lintz
*Attorney, Agent, or Firm*—Bromberg & Sunstein

[57] ABSTRACT

Dynamic segmentation of Geographical Information System (GIS) map data, stored in a relational database, converts linear-feature fixed-length attribute arrays, stored as columns in a relational table, into variable length attribute and location arrays for inclusion into an object-oriented map database which can be scanned for candidate values in the attribute and location arrays meeting certain search criteria. Selection of the scanned values is provided for. The object-oriented database may be queried to return the regions, specified in region coordinates, in each of the variable length location arrays, corresponding to the selected attribute values. The intersection of found regions with the selected values from the value arrays can be thereby determined.

16 Claims, 8 Drawing Sheets

SYSTEM FOR DYNAMIC SEGMENTATION ANALYSIS USING CONVERSION OF RELATIONAL DATA INTO OBJECT-ORIENTED DATA

FIELD OF INVENTION

The present invention relates to geographic information systems (GIS), and in particular, systems for handling data descriptive of linear networks.

BACKGROUND ART

Geographic information systems have traditionally relied on relational database technology. In some applications for geographic information systems, however, information is obtained for geographical features that change as a function of location. For example, with respect to such a feature as road, the number of lanes, the width of the roadbed, the quality of the pavement, the speed limit, the average traffic density are all attributes that change with respect to position on the road. Similarly with respect to other features, such as pipelines, railways, and utility lines, attribute values may vary with respect to position along the feature. Those attributes (such as lane width or pipe diameter) that are subject to change along the length of a feature (such as a road or pipe) are called herein "distributed attributes." To perform "dynamic segmentation" analysis of a linear network involves locating segments (of features) that satisfy user specified search criteria with respect to one or more distributed attributes. The processing of information pertaining to these linear networks to achieve dynamic segmentation poses formidable problems.

Traditional approaches to solving these problems rely on tracking of a relational database in complex ways. For example, one table for a road might include records showing positions on the road as a function of road length. Another table might show different speed limits as a function of each of the positions listed in the first table. Yet another table might contain information about traffic density at each of the positions. Another table might contain information about roadbed width at each position.

It can be seen that such an approach typically requires a first table, identifying positions on the road as a function of length, to have enough entries to permit the recording of meaningful detail of the attribute undergoing the most rapid change as a function of length. As a result, the attribute having the finest granularity typically requires the storage of data pertaining to all other attributes to have the same granularity, regardless of the inherent granularity of those attributes. Such a data structure imposes significant processing demands on a system that is asked, for example, to provide information about any particular attribute, over the length of the feature, since it is likely that the records for the attribute have more detail than necessary, and will not directly show those instances where the attribute changes in value. In addition, queries that involve combinations of attributes are difficult to process.

As an example, consider the following hypothetical database records:

| column | | | | | |
|---|---|---|---|---|---|
| 1 | 2 | 3 | 4 | 5 | 6 |
| US0123 | 0.0 | 9.4 | 2 | 12 | 1954 |

-continued

| column | | | | | |
|---|---|---|---|---|---|
| 1 | 2 | 3 | 4 | 5 | 6 |
| US0123 | 9.4 | 12.4 | 2 | 12 | 1962 |
| US0123 | 12.4 | 17.3 | 2 | 12 | 1962 |
| US0123 | 17.3 | 21.5 | 2 | 12 | 1962 |
| US0123 | 21.5 | 36.4 | 4 | 11 | 1971 | where
- column 1 = highway name
- column 2 = begin location for record
- column 3 = end location for record
- column 4 = number of lanes
- column 5 = lane width
- column 6 = year repaved Note that although the number of lanes changes only once over the structure of highway covered by those records, additional records are required because the year of repavement, for example, changes more frequently over the length. In this example, a user may wish to inquire of the database as to where the two lane sections of road are along the route. The answer is given in four segments:

```
from 0.0 to 9.4,
from 9.4 to 12.4,
from 12.4 to 17.3, and
from 17.3 to 21.5.
```

The computer or user would have to determine that these four segments lie continuously between 0.0 and 21.5. These limitations have traditionally been accepted as inherent in the nature of the data being processed.

Alternative structures have been used for processing geographic information. For example, a single user system is commercially available from Intergraph Corporation of Huntsville, Ala. 35894, under the trademark TIGRIS. TIGRIS is a package of applications, using object-oriented structure, that perform various geographic collection and analysis functions but not dynamic segmentation. Documentation for the TIGRIS system is available from Intergraph Corporation. The TIGRIS system also includes a utility for converting TIGRIS data to and from a relational database format for archival purposes.

SUMMARY OF THE INVENTION

In a preferred embodiment, the invention provides a system for performing dynamic segmentation analysis of attributes of a linear network, when the attributes are stored in a computer readable relational database. The invention in this embodiment has an arrangement for converting data in the relational database to resulting computer readable data in object-oriented form. It also has an arrangement for analyzing the resulting data in object-oriented form and providing an output of the analysis. In some embodiments, the object-oriented form includes (i) a plurality of attribute value arrays of variable length, with each consecutive value in the array associated with a value of an attribute at a consecutive region of a feature and (ii) a plurality of corresponding location arrays of variable lengths, with each location array associated with a given attribute value array and providing region coordinates for each successive value in the corresponding value array. When each region of a feature is effectively one-dimensional (rather than two- or three-dimensional, and/or including time and/or other dimensions), then each region is described by a (line) segment along the feature. The coordinates of the region or segment are normalized in a preferred embodiment. In further embodiments, the invention provides an arrangement for scanning the value arrays for candidate values meeting specified search criteria and for selecting such values. It also provides an arrangement for finding the regions, specified in region coordinates, in each of the related location arrays corresponding to the values selected. It finally provides an arrangement for determining the intersection of the found regions associated with the selected values from each value array, and thereby identifying regions of the feature in which the specified set of search criteria are satisfied.

BRIEF DESCRIPTION OF THE DRAWINGS

The foregoing aspects of the invention will be more readily understood by reference to the following description taken with the accompanying drawings in which.

DETAILED DESCRIPTION OF SPECIFIC EMBODIMENTS

Figure 1:
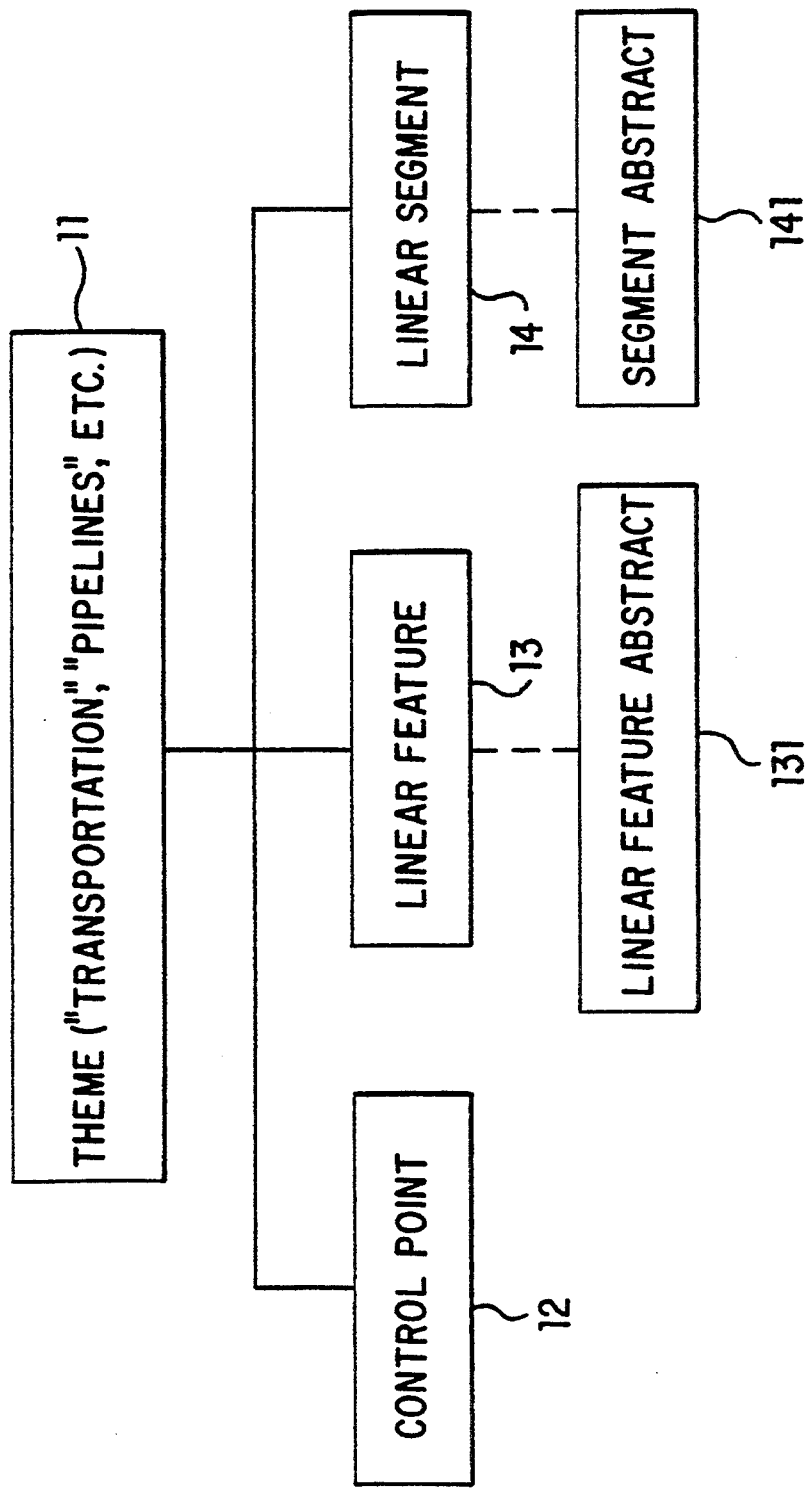
FIG. 1 is a diagram of the basic object data model used in a preferred embodiment of the invention.

A. General Principles.

The present invention, in a preferred embodiment, relies on attribute data stored in a relational database, but achieves the segmentation analysis of this data by first converting the data into object-oriented form. Then the analysis is performed on the resulting data in object-oriented form.

Referring again to the example given above in discussion of prior art approaches, if the relational data is converted into object-oriented form, each attribute may be stored independently as part of the object as follows:

| number of lanes: | 2 | from 0.0 to 21.5 |
| | 4 | from 21.5 to 45.3 |
| lane width: | 12 | from 0.0 to 12.4 |
| | 11 | from 12.4 to 45.3 |
| year repaved: | 1954 | from 0.0 to 9.4 |
| | 1962 | from 9.4 to 21.4 |
| | 1971 | from 21.5 to 36.4 |
| | 1976 | from 36.4 to 45.3 |

The redundancy in the data is substantially eliminated and substantially reduced storage achieved.

Technically, the input values and their beginning and end locations are stored as arrays with the object. This takes advantage of the use of "abstract data types" available with the object model. Objects are not restricted to the standard data structures for values. Most relational databases allow "integer," "float," "character string," etc., but the object model allows for arrays of the above, complex "c" type structures, and even function pointers.

The distributed attribute data is stored with the values in one array of variable length, and the beginning and ending locations for those values are stored in another array of exactly twice the length of value array. The locations are normalized, so that 0.0 represents the beginning of the feature as 1.0 represents the end.

In processing of queries, the object then can dynamically intersect these arrays of data with simple mathematics and provide quick answers to network queries without requiring any preprocessing.

One immediate advantage to this approach is the ease with which attributes on completely diverse distributions can be integrated. This means that data collected by one department on a distribution (level of detail) that makes sense to that department, can be immediately integrated in the object with data from another department on a totally unrelated distribution. Another advantage is that answers can be given in their normalized form.

Let us return to example that began this section of the application and to the question of where the two lane sections of road are along a route, posed in the Background Art section of this application. In object-oriented form, all contiguous two lane sections will be shown as single entities, not as a number of small adjacent segments. Thus instead of the four segments described above in the prior art discussion, the object answer would simply be from 0.0 to 21.5. No artificial segmentation is retained. In addition, the locations along the object (route) obtained as an answer to a query be used in turn to define a new object, which can be given all attribute information from the original route that pertains to these locations and further queries can be directed to this object. Hence, one can then dynamically segment the segments, since the new segment object retains the same intelligence of the parent route, only restricted to the location where it resides.

Although the invention has been described by way of example with respect to features that are one-dimensional (linear), the invention is equally applicable to multi-dimensional features. The object model permits storing not simply a simple geometry (beginning and ending locations) for a linear feature, and store an attribute value associated with this segment, but can also store a complex geometry (for example, coordinates specifying a two-, three-, or n-dimensional region, with a dimension potentially being time or some other time-dependent variable) associated with an attribute value. This means that one could store a list of geometries for an attribute, for example, representing the shape of a road or river at increments of time. Any attribute that can be described as a function of the geometry of the feature can be stored with its functional definition, and dynamically interrogated. This opens the door for temporal analysis and even predictive modeling. Since the object is a single point of integration for software and data, complex relationships between the geometry and attributes can not only be stored and interrogated, but managed as well, such that attribute values can be immediately recalculated upon any geometric changes. A wide range of complex relationships can be defined and modeled in object-oriented form.

B. Nature of Preferred Embodiment.

The invention described herein can be implemented with any object-oriented environment that (i) will support objects that can have variable length arrays as instance data and (ii) is capable of representing geographic point and linear features (i.e., coordinate data).

The implementation of the invention described herein utilizes an Intergraph workstation running UNIX with at least 32 Mbytes of RAM, and 34 Mbytes of hard disk space. The invention has been implemented as a new subsystem of an existing product of Intergraph Corporation called MGE Dynamic Analyst, an object-oriented application designed to provide analytic functions for performing GIS analysis. A copy of the documentation (December, 1991) for this product prior to modification is enclosed herewith and incorporated herein by reference. In this implementation, input data is obtained from relational databases. The input data is extracted and modeled in the object-oriented format for the duration of the analysis. Data can then be output to new MGE design files and relational database records.

1. Object Data Model Implemented and Conventions Used.

The basic object data model implemented in the embodiment has a hierarchical structure diagrammed in FIG. 1. Referring to FIG. 1, a "theme" 11 identifies the data structure as pertaining to a transportation system, a pipeline system, or the like. The system employs a plurality of control points 12 and linear features 13. "Control points" are digitized point features that give an association between a specified graphics location on the linear feature graphics element and the distance that point is from the origin of the linear feature in real world units. They are modeled in this system as point features with an attribute for the identification of the linear feature that they are associated with, and an attribute for the distance from origin. (Another attribute may be present if the linear ID is insufficient to determine uniqueness for the control point as in the case for example, of a county name.) Additionally, control points may be named with an ID. This type of control point is commonly called a reference marker, and distances can then be measured from the reference marker by name. "Linear features" 13 in the context of the control network are distinguished by having a unique (for the dataset) ID (or unique combination of an ID and a secondary ID) and by being associated at load time with the generic linear feature abstract class. Direction along the linear feature is determined by control point distance (if present), or by the rule: east-to-west, then south to north. A linear segment is an object that is created as the result of dynamic segmentation of a linear feature. The object contains all attribute information pertinent to the defined segment of the linear feature.

Linear feature abstracts 131 and segment abstracts 141 are examples of an "abstract class". An abstract class results from a subclassing technique in this system where a generic alias may be assigned to a whole group of features, and where that alias may also include attribute definitions. For example, one may have state highways, local highways and interstate highways. An abstract class named "road" will allow one to refer to all of the above as "road" both in querying and in manipulations. This system assumes that insofar as distributed attributes go, they are not uniquely defined for each class but may be defined globally at the abstract class level. (Number of lanes is defined once for all "roads," not individually for state highway and federal highway.)

For further explanation of this model, the following conventions are used:

Control Network: The control network is the set of linear features and control points that associate location and distance along the ground with graphic elements.

Location: The linear features are represented as linear graphic elements, where the graphic coordinates are associated with ground coordinates in xy through the defined coordinate and projection system of the graphics file. The elevation information is not used in the current control network.

Distance: Distance along the linear feature must be calculated in order to correctly assign distributed attribute values. Accuracy in this measurement is directly based upon the presence of control points. A control point is a "point type" feature which has at least two key attributes associated with it; the ID of the linear feature is associated with, and a distance assumed to be 3d from the origin of the linear feature. There may optionally be a secondary key (such as county) to uniquely identify the linear feature and the control points along that linear feature. Begin and end locations for distributed attribute values are found by interpolating between these known control points. Control points may be implicitly or explicitly referenced for distance computation. (See reference systems). The second location in the graphics file of the control point element is assumed accurate. Therefore, the ability to locate a point on a linear feature where that point's location is given as a distance from the origin of the linear feature (or as a distance from a labeled control point on the linear feature) is directly dependent on the number of accurately measured and placed control points for that feature.

Distributed Attributes: Distributed Attributes are those attributes of a feature whose value changes based on location along the feature. For example, a road may be 2-lane from its origin, continuing for 4 miles, then change to 4 lane for 8 miles, then back to 2 lane for the remainder or the route. The distributed attribute for "number of lanes" must not only store the values "2", "4" and "2", but must also include (or point to) the start and end locations for these values. In a Relational Database table, columns are provided for the value and for the start and end locations of that attribute value. How start and end is specified is what differentiates one referencing system from another.

Reference System: The reference system is the technique used for locating the start and end locations of distributed attributes along a linear feature in the control network.

Some common techniques include:
  start and end referenced as distance from the origin of the linear feature;
  start and end referenced as offsets from labeled reference markers along the linear feature; and
  start referenced as a distance from origin and end as a delta from the start. The reference systems supported in this embodiment include the following:
Known Marker System (Reference Marker System):
  start and end of attribute value is given by giving a reference marker name and an offset ± from the marker
  example:
    Route 271 is "2" lane from 0.3 miles past Marker A to 0.1 miles before Marker B
    a typical database record might then look like:

| 00271 | 2 | A | 0.3 | B | −0.1 |
|---|---|---|---|---|---| this system assumes the existence of a point-type feature in the graphics file with attributes for linear feature ID (e.g., "271") and reference marker id (e.g., "A"). As with all control points an attribute containing the 3d distance from origin is also assumed to be present Distance system (Milepost, postmile ... ):
  start and end for attribute values are given as distance from the origins of the linear feature
  example:
    Highway 237 has a road bed width of 29 feet from 10.3 miles to 15.2 miles
    a typical database record might then look like:

| 00237| | 29| | 10.3| | 15.2 |
|---|---|---|---|---|---|---| start and end may also have offsets
  example:
    Route 56 has pavement type 4 from 0.2 miles before milepost 12 to 0.1 miles past milepost 22.0
    a typical database record might then look like:

| 00056| | 4| | 12.0| | −.2| | 22.0| | .1 |
|---|---|---|---|---|---|---|---|---|---|---|

Here such interpolation must incorporate the offsets as well, such that 12.0 is found first then the interpolation factor applied to locate −0.2 miles from 12.0.

Distance-Length (Shortform Milepost):
  start location for the attribute is given as distance from the origin of the linear feature
  end location for attribute value is given as ± distance from the start location
  example:
    Route 431 is under construction from milepost 12.1 for 2 miles
    a typical database record might then look like:

| 00431|construct| | 12.13| | 2.0 |
|---|---|---|---|---|---|

Clearly there are many other ways to reference data along a linear network, including x, y, z location, and the invention is not dependent upon any specific reference system.

Dynamic Segmentation: Dynamic Segmentation is the technique by which the portion(s) of a linear feature or set of linear features which satisfy the conditions of a query are found. Essentially, the linear features are segmented at those locations which satisfy the query. The "segment" may be virtual (i.e., display only) or may be a new feature, sharing geometry with the original linear feature. Dynamic Segmentation is a query capability, and is performed on demand based on the constraints of the query. It requires no "pre-segmentation" of the linear feature(s), but performs all overlays and intersections of attribute data at request time.

2. Conversion of Relational Data to Object-Oriented Form.

Three basic commands are used in the implementation: Load Control Network, Load Distributed Attributes, and Dynamic Segmenter. The implementation of the present invention described herein loads graphic data showing feature coordinates (the "Load Control Network" Command) and the relational database pertaining to the feature (the "Load Distribution Attributes" Command) into variable length arrays, the structure of which is determined by the object-oriented data model.

(a) Loading the Control Network

This section describes the "Load Control Network" command. The control network is loaded from MGE design files and relational databases. An additional input is the name of the parameter file that describes the control network and distributed attribute information.

The control network consists of graphic data including linear features with attributes and control points with attributes. The linear feature is represented as a linear object, with each feature consisting of one geometrically contiguous section. This union allows referencing of any linear feature listed in the parameter file by a single alias, say "roads" for example. All attribute data in the MGE attribute table for the linear feature is defined at and loaded to the base feature, except for the linear feature identifier. The abstract class contains an "ID" attribute. (If a secondary ID is present, it is defined as SECONDARY ID on the abstract class).

The control points are loaded as point features. The geometry of each control point will be carried over from the design file. The attribute data will be carried over from the attribute table. Input geometry may be any one of the following element types: text node, text, point, or line (zero-length). The user may specify only one feature as input for the control point class.

When loading the control network, two anomalies, concurrent routes and non-contiguous routes, are dealt with.

Concurrent Routes—The concurrent portion of two routes will be stored once topologically. A base feature will be created for each unique linear features "ID" sharing the route. Concurrent routes will be identified by the multiple attribute linkages attached to the linear feature in the design file. If a feature is to be considered as shared by multiple routes, then the shared section must exist in the design file as a tagged graphic with its own mslink, and be multiply tagged with respect to attributes. To optimize processing of concurrent route data a table of concurrent routes will be maintained which lists the concurrent routes by object id pairs. The internal implementation of the table is a tuple set.

Non-contiguous routes—Non-contiguous routes will be modeled as a base feature for each contiguous section of the linear feature.

In this implementation, the following conventions are observed:

A. Linear Features:
  1) All Linear components are MGE features, tagged with attributes stored in the MGE Project Database.
  2) Every linear feature has a unique "id" attribute (e.g., "US065").
  3) To model a section which is actually 2 routes, (concurrent routes) the graphic section is multiply tagged, and is disjoint from non-concurrent sections.
  4) Only point string type microstations elements are valid input; no arcs or conic sections (i.e., type 3 and 4)
  5) A secondary key is used if the ID is insufficient to insure uniqueness.

B. Control Points:
  1) Every control point is a digitized MGE feature.

2) Every control point contains a "distance from origin" attribute. This distance is assumed to be 3d.
3) Every control point contains a "distance from origin" attribute. This distance is assumed to be 3d.
4) Every control point contains an attribute for the "id" of the linear feature it is associated with. If uniqueness is indeterminate by linear id only then a secondary key (i.e., county) is included for all control points.
5) If control points are given then:
   a) if more than 1 is given then direction is implicitly given by the distance values on the control points;
   b) if only one is given then direction is determined by the East-to-West, North to South rule;
6) It is preferred that a control point with distance of 0.0 be given for marking the beginning of the linear feature. This is particularly useful for linear features which cannot be uniquely identified by id. (e.g., a route spans 2 countries then, measurements along the route need to be referenced from the county line or the route origin. A marker at both locations with a distance of 0.0, and a secondary key of "county" would insure uniqueness in location).

(b) Loading Distributed Attributes.

This section describes the Load Distribute Attributes command. Distributed attributes are those attributes that may change in value along the length of a linear feature. In contradistinction, a non-distributed attribute has a value that is true for the entire length of a linear feature.

The tables may reside in any schema that is available through RIS (the generic Intergraph Relational database interface) and that is listed in the parameter file.

The tables should be in a form consistent with the supported reference system types described above in connection with the Reference Systems.

Some highlights of the design
  read tables from any RIS schema (external or local)
  define attributes as needed to store distributed attribute values
  fully support loading data onto anomalous control networks:
    discontinuous roads, and concurrent routes.
  correctly determine begin and end of segmented data based on reference system type and table data Subsequent loading of distributed attributes that are already loaded will replace the values that currently exits. No history of attribute values is maintained.

In this implementation, the following conventions are observed:
A) Each table of distributed attributes conforms to one of the referencing systems supported by MGE Dynamic Analyst.
B) Each table contains a column for linear feature id. If location is not uniquely determined by this id then a secondary key must be given AND control points must exist which uniquely identify the portion of this linear feature referred to.
C) Begin and end locations are available from the table as necessary for the indicated referencing system used.
D) Table may exist in any RIS database. Read access will of course be required.
E) Where used "lane ids" are consistent. For example, if "L" is used to indicate the left lane in one table, "L" is used for the left lane for all tables.

3. Dynamic Segmentation.

After the geographic and relational database data are loaded into object oriented form, the resulting data can be subject to analysis and, in particular, to dynamic segmentation. As described previously, the resulting data is in the form of variable length arrays. For each attribute, a value array contains successive different values of the attribute along the feature, and a related location array of twice the length of the value array, contains beginning and ending normalized locations for each value in the value array. Thus, returning to the example at the beginning of this section, the US0123 object would have a number of arrays associated with it. One array would be the values for the number of lanes attribute:

[2,4]

A related location array would contain the normalized beginning and ending location for each value of this attribute:

[0.0, 0.5, 0.5, 1]

A pair of similar arrays would exist for each of the other attributes, lane width and year repaved. Thus for values for the year repaved:

[1954, 1962, 1971, 1976]

and locations for these values:

[0.0, 0.2, 0.2, 0.5, 0.5, 0.8, 0.8, 1.0]

For the system to identify the segment of highway having two lanes and paved before 1970, it will first scan the value arrays for candidate values separately meeting the specified conditions (i.e., 2 lanes, <1970) and then find those locations in each of the related location arrays corresponding to those values selected. Next it will identify those locations having attribute values that satisfy both conditions, by intersecting the locations associated with the selected candidates for each value array. In our example, the candidate value selected are
  number lanes: [2]
  year repaired: [1954, 1962]
The locations associated with these selected values are:
  number of lanes: [0.0, 0.5]
  year repaved: [0.0, 0.2, 0.2, 0.5]
The intersection of these locations is

[0.0, 0.5], and this segment, which satisfies the search condition, can itself be represented as an object (linear segment), and for this linear segment, additional queries can easily be made and answered, owing to the object-oriented structure. For example, we could ask questions about the lane width on this new segment.

As implemented, dynamic segmentation is invoked by the Dynamic Segmentation command. This command enables the user to segment a linear feature or a group of linear features on one or more boolean connected attribute conditions. Output is new features and optionally a result set of new features or display only. Previously created statements may be retrieved by name and edited and/or reexecuted. On output the user may specify what attributes from the original route are to be populated on the segment feature. These segments may then be further segmented.

4. Software Structure.

Figure 2:
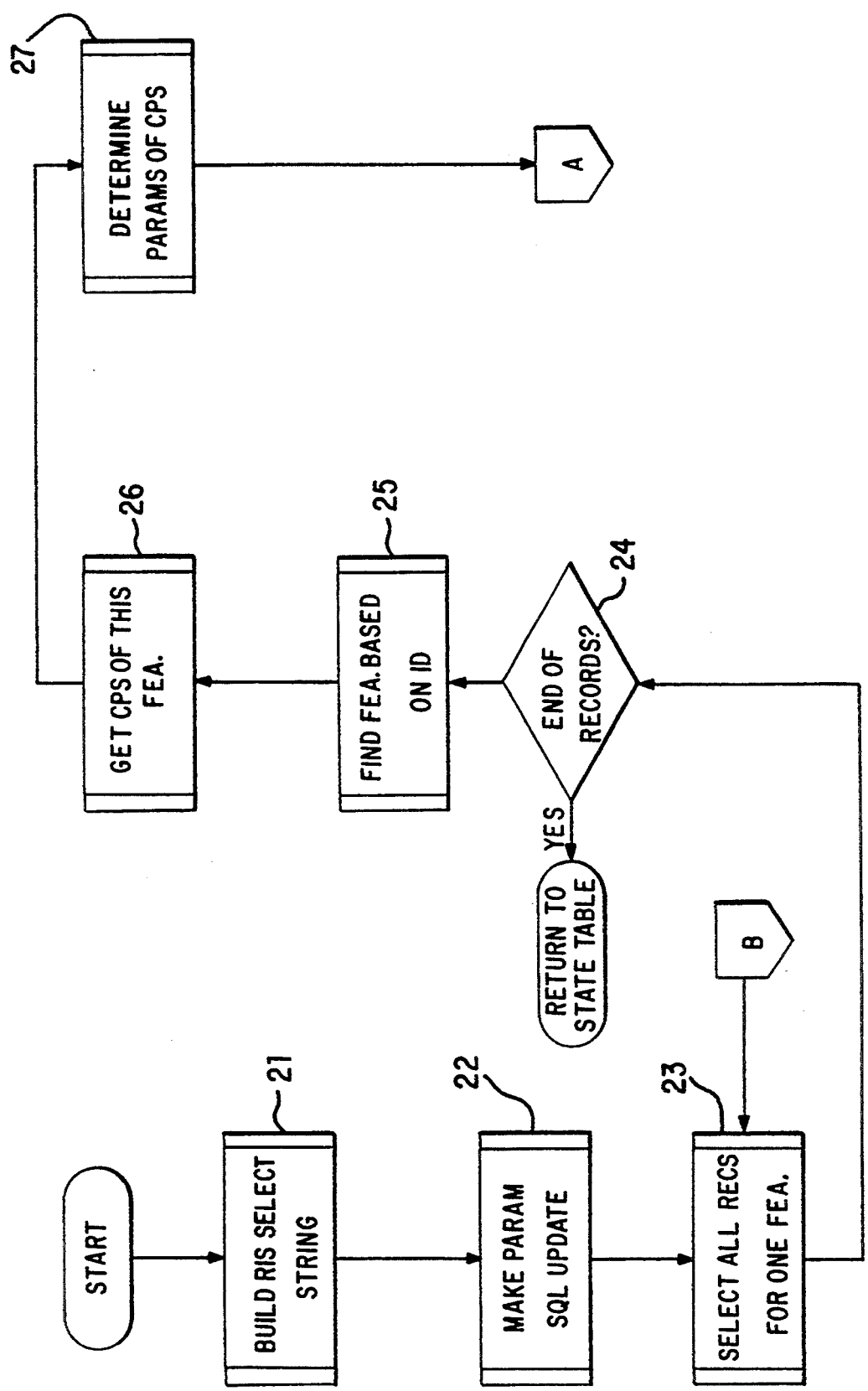
FIGS. 2–5 are diagrams illustrating the implementation of the Load Distributed Attributes command of the embodiment of FIG. 1.
Figure 3:
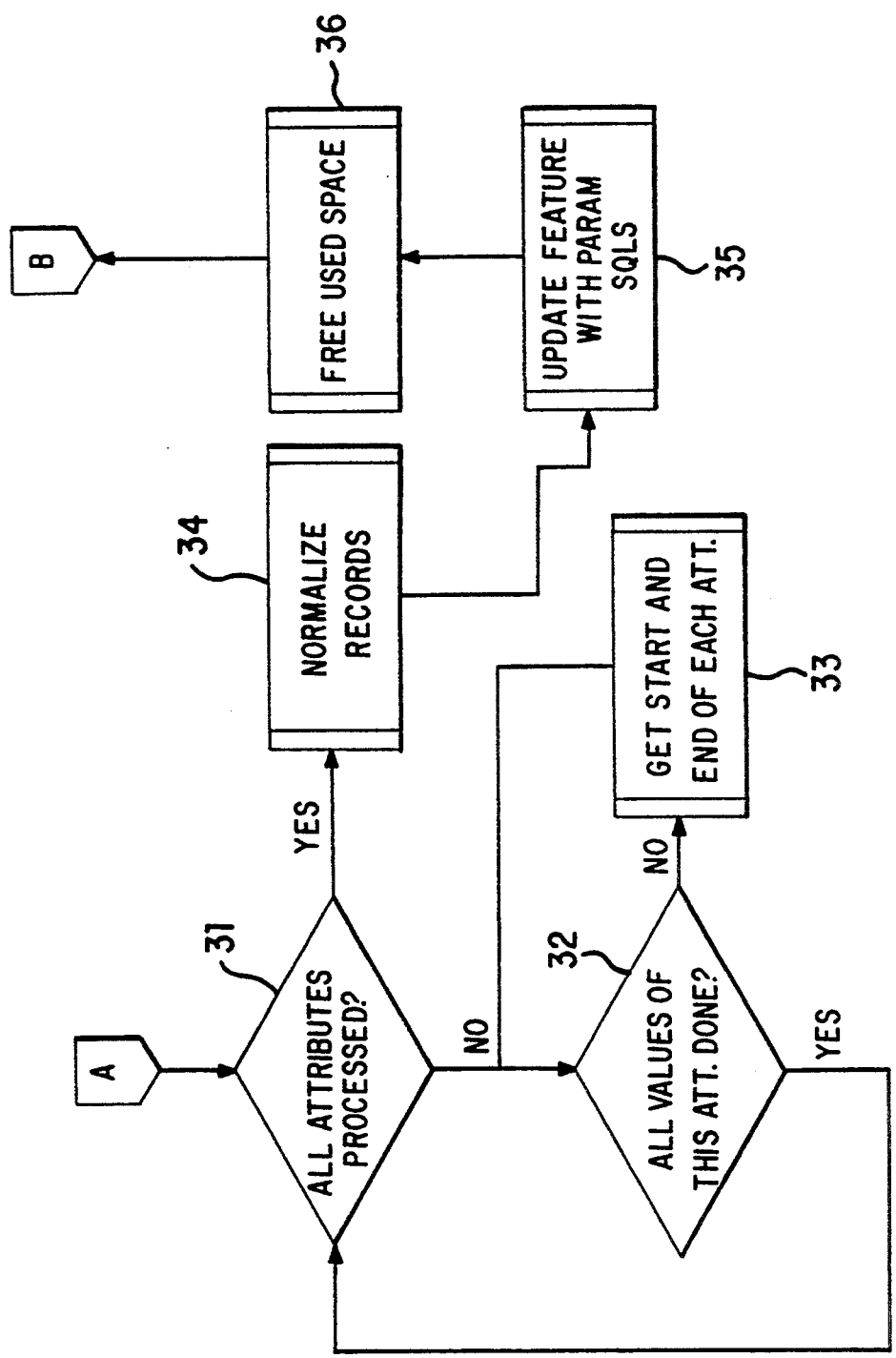

The implementation of the Load Distributed Attributes command, which causes conversion of the GIS data in relational database form into object-oriented form, is illustrated in the diagrams of FIGS. 2-5. FIGS. 2 and 3 show the general structure of the conversion. Under steps 21, the query to the relational database is formulated to extract the pertinent data. Under step 22, a corresponding statement, using SQL format in the object-oriented data structure, is formulated for the purpose of loading this data into the object-oriented format. All the records for a given feature are then selected in step 23 from the relational database, and the processing of these records initially involves (in step 25) finding the feature in object format to which the data from the records identified in step 23 will be loaded. Next involved is getting the control points of this feature (step 26), determining the location of the control points (step 27) along the feature, and then processing of the attributes, by getting (step 27) the start and end locations of each attribute (step 330 by interpolation between the control points, and then, after completion (determined in step 31) of attribute processing, normalizing (step 34) the object-oriented location records, loading (updating) (step 35) the feature object-oriented data with information relating to these attributes and freeing memory (step 36) to permit processing of the next feature (back to step 23).

Figure 4:
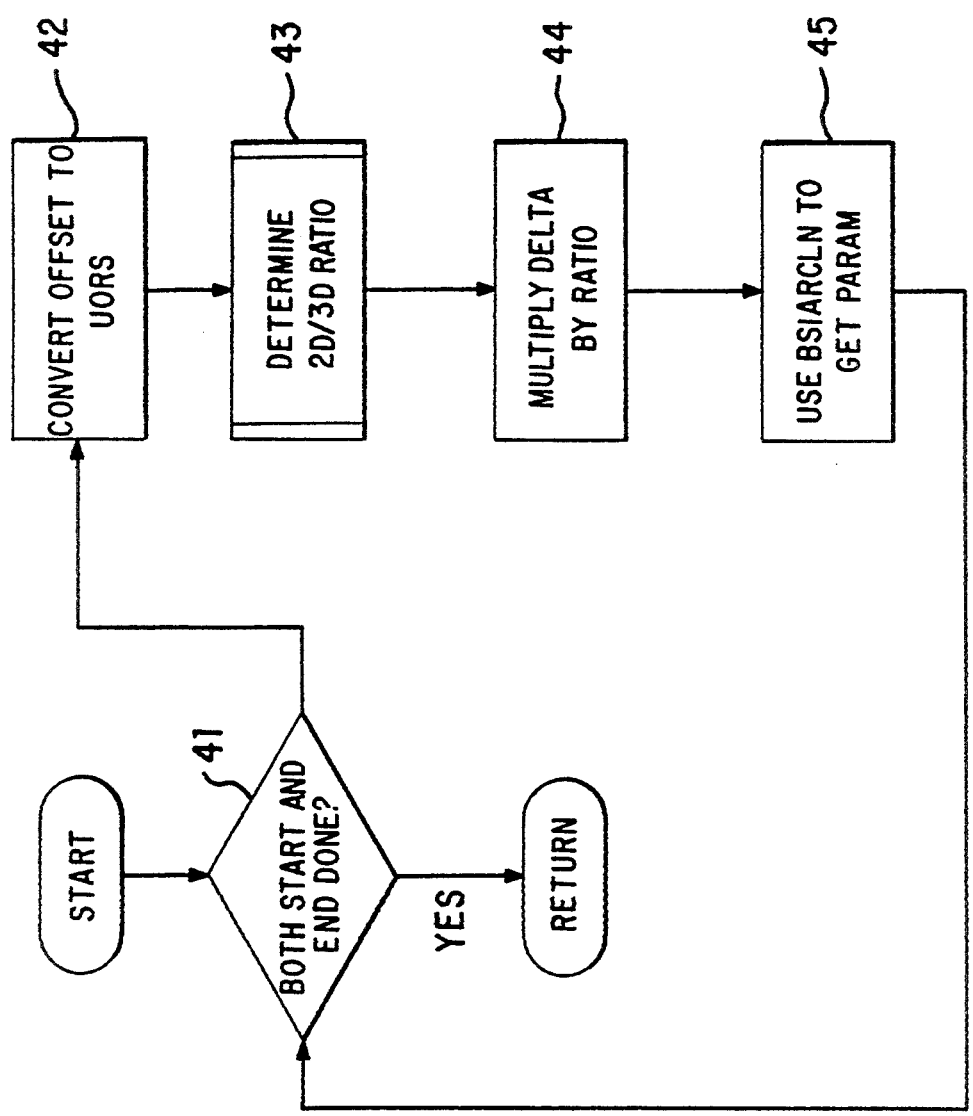

FIG. 4 illustrates the method by which the start and end locations of each attribute (step 27) are determined. First the offset of these locations in converted to graphic units of resolution (UORs) in step 42. Next, in step 43, the ratio of control point distances obtained in step 26 to the UOR locations in step 43 is determined and the difference between the converted start and end locations after the conversion in step 42 is multiplied (step 44) by this ratio. Finally a mathematical routine (BSiarcln) is used to compute the graphic location used to display the start and end of each attribute in object-oriented format.

Figure 5:
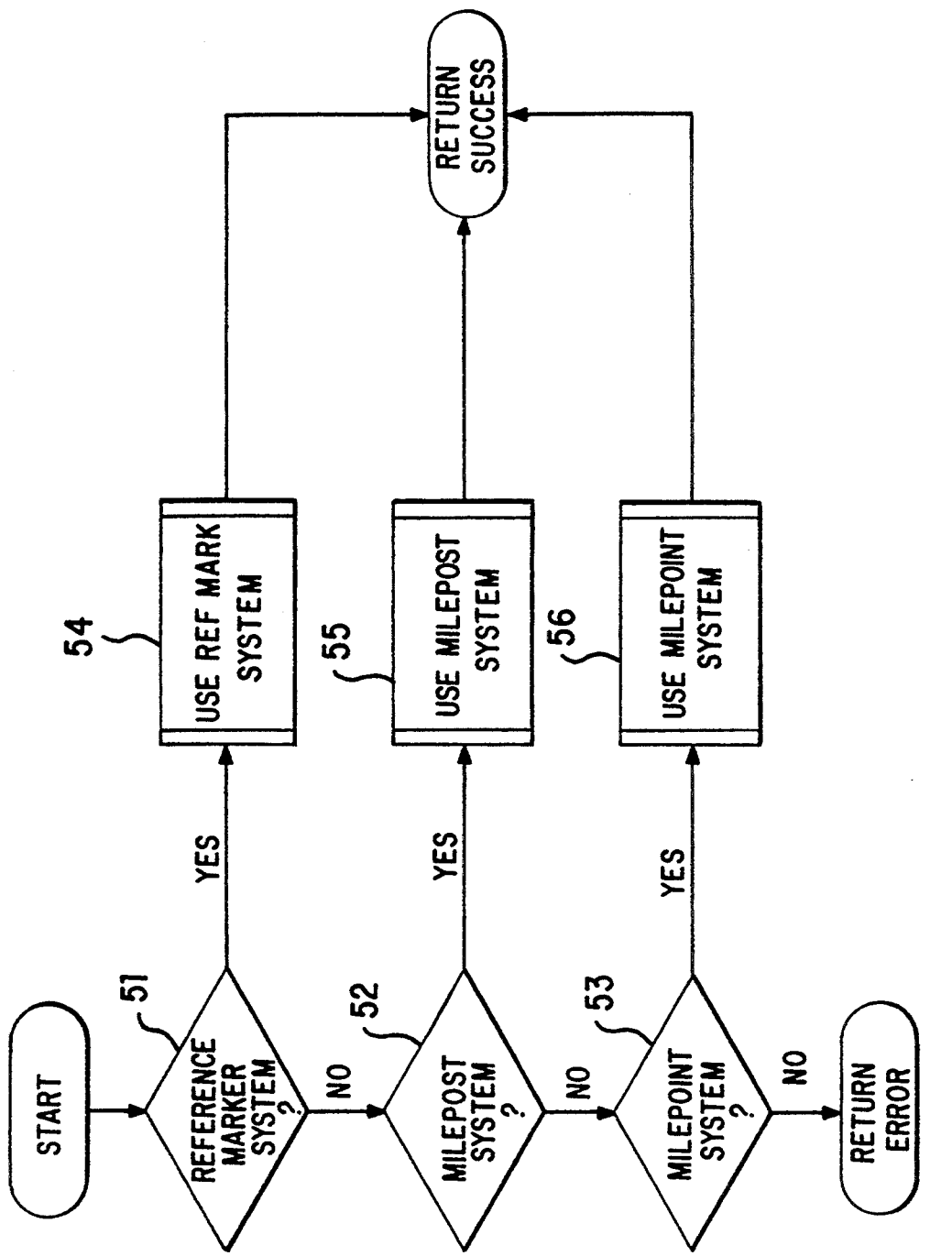

FIG. 5 illustrates the selection of the appropriate control point measurement system 54, 55, or 56, depending on whether the reference system in assembly of the relational data involves a reference marker system 51, a milepost system 52, or a milepoint system 53.

Figure 6:
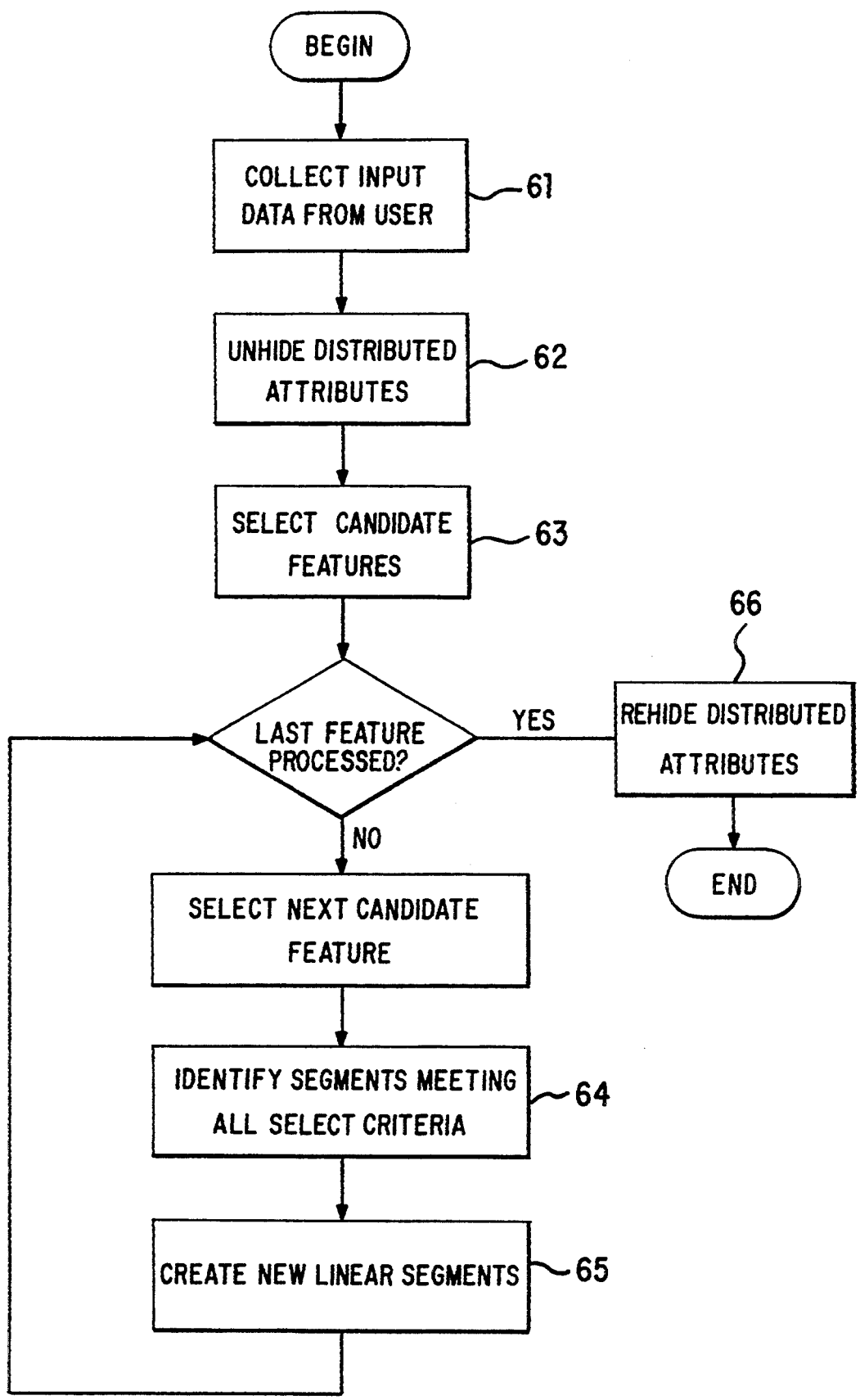
FIG. 6 is a diagram illustrating the implementation of the Dynamic Segmentation command of the embodiment of FIG. 1.

FIG. 6 illustrates the basic implementation of the Dynamic Segmentation command. Under step 61, there is collected input data from the user (using data obtained from filling out the screen forms in FIGS. 11 and 12) to define the desired search criteria and output format. Normally all distributed attributes in the object oriented data format are hidden from the display by various processes, because the distributed attributes cannot meaningfully be displayed by these processes. However, In accordance with step 62, the attributes indicated in step 61 are "unhidden" for the purpose of dynamic segmentation, where their display is meaningful and important. In step 63, there are selected all candidate features that satisfy at some location any of the search criteria collected in step 61. Next in step 64, there are identified all segments of each feature that meet all of these search criteria. In step 65, there is created a new linear segment for each segment that has been identified in step 64 and each new segment created is displayed in accordance with the output format collected in step 61. In step 66, following the display in accordance with step 65, all distributed attributes are again hidden from display.

Figure 7:
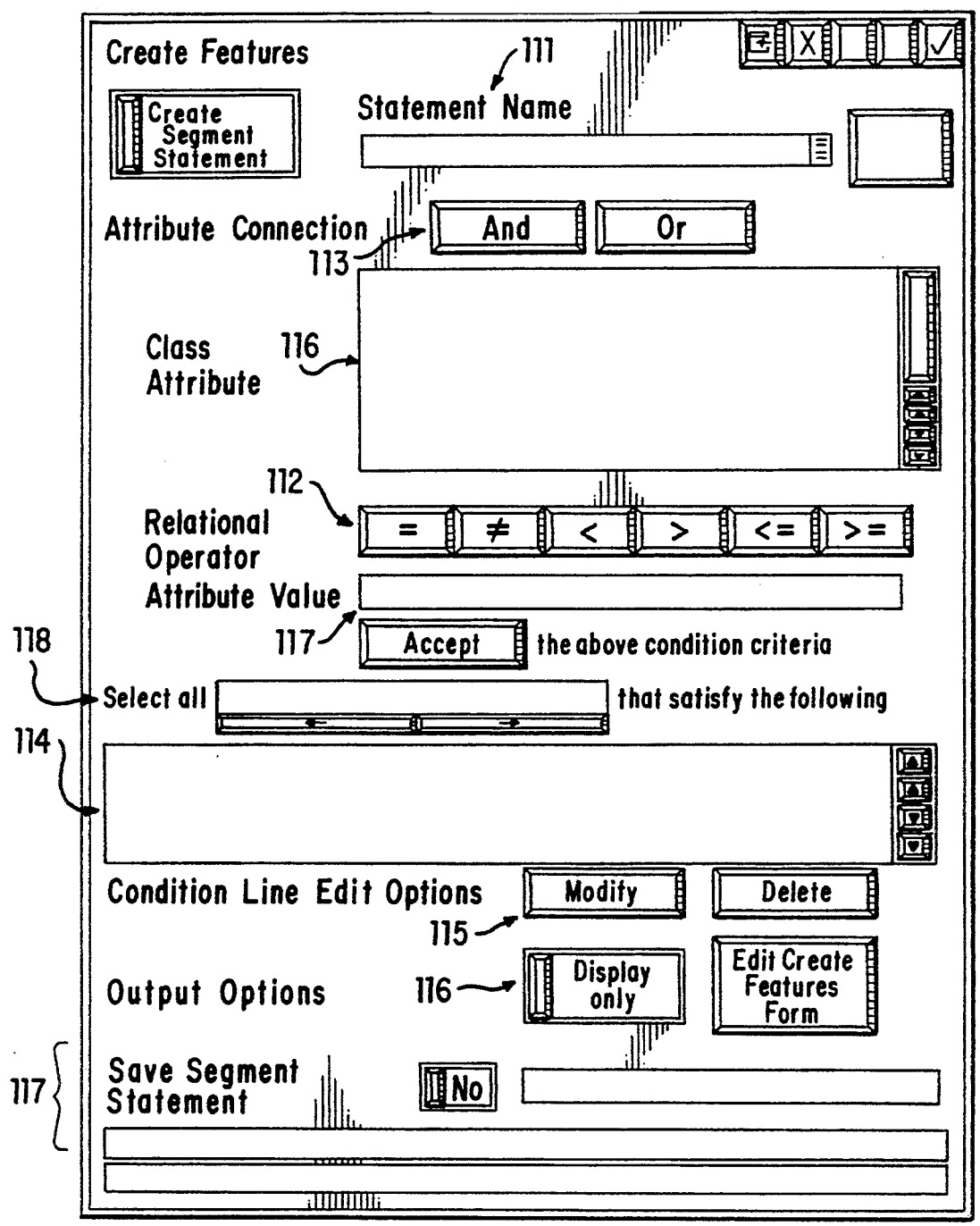
FIGS. 7 and 8 illustrate the computer screen forms used in specifying a dynamic segmentation analysis in connection with the embodiment of FIG. 6.
Figure 8:
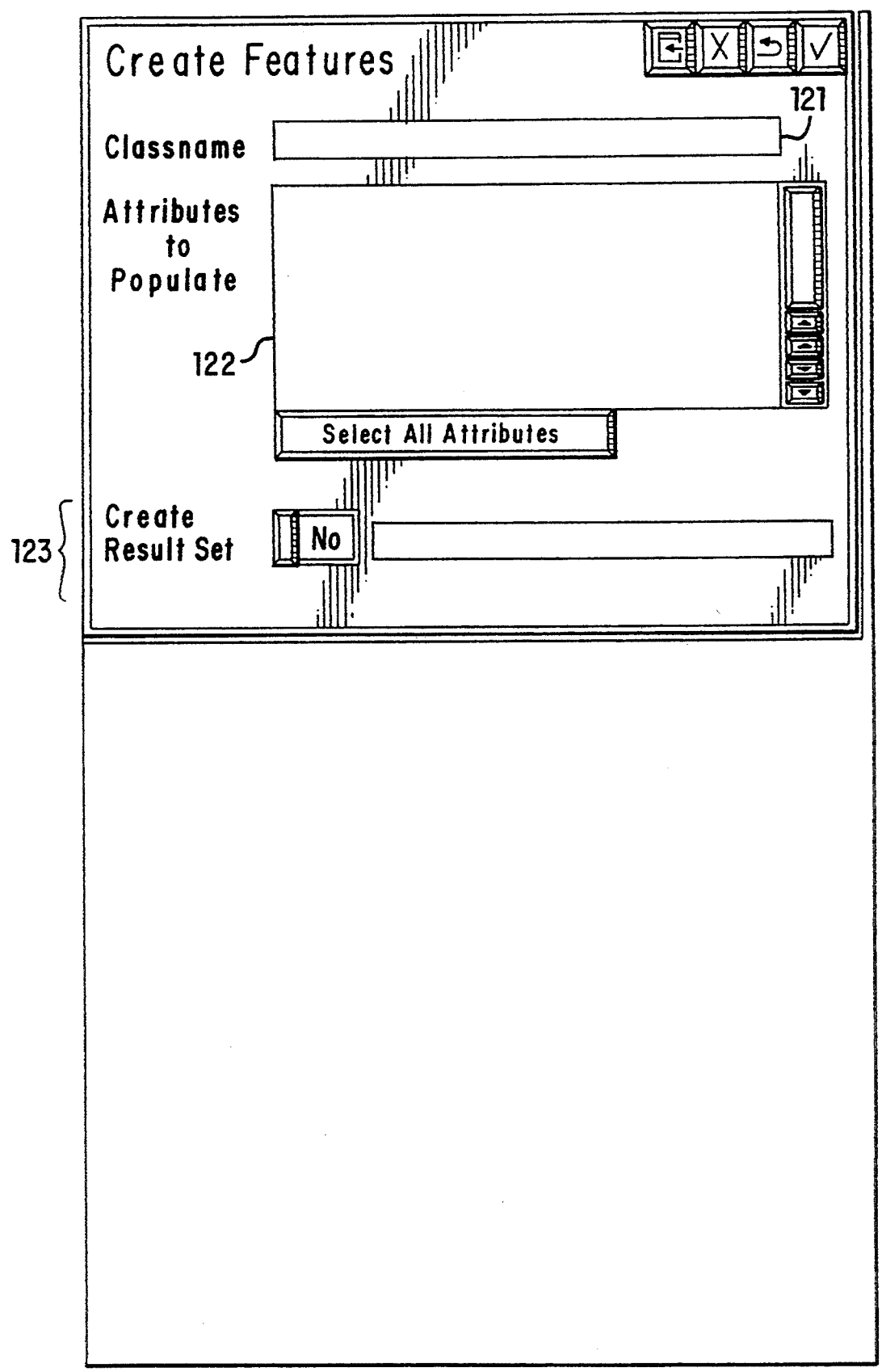

In FIG. 7 is shown the main screen form used for specifying the search criteria. (The screen forms of FIGS. 7 and 8 are covered by copyright held by Intergraph Corporation.) First there can be specified the class 111 of linear features for which to search (here called the "Statement Name"). These linear features have distributed attributes that are shown in box 116, from which a selection may be made in specifying the search criteria. The attribute conditions to search for may be specified in conditional terms using the relational operator buttons 112 for $=, \neq, <, >, \leq, \geq$, and the attribute connection buttons 113 for "and" and "or", together with any desired attribute values that are specified in box 117, to build a set of conditions in the box 114. These conditions can be edited using the condition line edit option buttons 115. The output options are specified either as display only or else in the screen form shown in FIG. 8 in accordance with buttons 116. Region 117 permits saving of these search criteria as a named file. Box 121 of FIG. 8 permits the user to name the linear segment class to be provided as an output; if the linear segment class has been previously named it may be selected here. Box 122 permits the user to specify which attributes of the "parent" feature (i.e., the one subject to segmentation analysis) will be included in the linear segment to be provided as an output. The bottom area 123 permits identification of all of the segments resulting from these search conditions at any desired later time as a named result set. This last function is of particular value when viewing the displayed features to show in context the results in review of various previous segmentation analyses.

What is claimed is:

1. A system for performing dynamic segmentation analysis of attributes of a linear network, such attributes stored in a computer-readable relational database, the system comprising:
   (a) conversion means for converting the data in the relational database to resulting computer-readable data in object-oriented form, the object-oriented form including:
      a plurality of attribute value arrays of variable length implemented in storage in a digital computer, each consecutive value in the array associated with a value of an attribute at a consecutive region of a feature; and
      a plurality of corresponding location arrays of variable length, implemented in storage in a digital computer, each location array associated with a given attribute value array and providing region coordinates for each successive value in the corresponding value array;
   (b) processing means for analyzing the resulting data in the object-oriented form; and
   (c) output means for providing an output of the analysis performed by the processing means.

2. A system according to claim 1, wherein the processing means includes:
   (a) scanning means for (i) scanning the value arrays for candidate values meeting a specified first set of search criteria and (ii) selecting such values;
   (b) locating means for finding the regions, specified in region coordinates, in each of the related location arrays corresponding to the values selected; and
   (c) intersecting means for determining the intersection of the found regions associated with the selected values from each value array, and thereby identifying regions of the feature in which the specified first set of criteria are satisfied.

3. A system according to claim 1, wherein each region is described by a segment along the feature and the coordinates identifying the segment are normalized.

4. A system according to claim 2, wherein each region is described by a segment along the feature and the coordinates identifying the segment are normalized, so that the intersecting means identifies segments of the feature in which the specified first set of criteria are satisfied.

5. A system according to claim 2, for performing dynamic segmentation analysis on an identified region of a feature, wherein the scanning means includes means for scanning a portion of the value arrays, corresponding to the identified region in which the first set of search criteria are satisfied, for candidate values meeting a second set of search criteria, and the locating means and intersecting means include means for acting interactively to permit identifying regions of the feature in which the specified first and second sets of search criteria are both satisfied.

6. A system for performing dynamic segmentation analysis of attributes of a linear network, the system including:
   (a) a plurality of attribute value arrays of variable length implemented in storage in a digital computer, each consecutive value in the array associated with a value of an attribute at a consecutive region of a feature; and
   (b) a plurality of corresponding location arrays of variable length, implemented in storage in a digital computer, each location array associated with a given attribute value array and providing region coordinates for each successive value in the corresponding value array;
   (c) scanning means for (i) scanning the value arrays for candidate values meeting a specific first set of search criteria and (ii) selecting such values;
   (d) locating means for finding the regions, specified in region coordinates, in each of the related location arrays corresponding to the values selected; and
   (e) intersecting means for determining the intersection of the found regions associated with the selected values from each value array, and thereby identifying regions of the feature in which the specified first set of criteria are satisfied.

7. A system according to claim 6, wherein each region is described by a segment along the feature and the coordinates identifying the segment are normalized, so that the intersecting means identifies segments of the feature in which the specified first set of criteria are satisfied.

8. A system according to claim 6, for performing dynamic segmentation analysis on an identified region of a feature, wherein the scanning means includes means for scanning a portion of the value arrays, corresponding to the identified region in which the first set of search criteria are satisfied, for candidate values meeting a second set of search criteria, and the locating means and intersecting means include means for acting interactively to permit identifying regions of the feature in which the specified first and second sets of search criteria are both satisfied.

9. A computer-implemented method for performing dynamic segmentation analysis of attributes of a linear network, such method comprising:
   (a) converting the data in the relational database to resulting computer-readable data in object-oriented form by the steps of:
      (i) providing a plurality of attribute value arrays of variable length implemented in storage in a digital computer each consecutive value in the array associated with a value of an attribute at a consecutive region of a feature; and
      (ii) providing a plurality of corresponding location arrays of variable length, implemented in storage in a digital computer, each location array associated with a given attribute value array and providing region coordinates for each successive value in the corresponding value array; and
      (iii) filling the arrays based on data in relational database;
   (b) processing the resulting data in a digital computer to perform the analysis; and
   (c) providing an output of the analysis in step (b).

10. A method according to claim 9, wherein step (b) includes:
   (i) scanning the value arrays for candidate values meeting a specified first set of search criteria and selecting such values;
   (ii) finding the regions, specified in region coordinates in each of the related location arrays corresponding to the values selected; and
   (iii) determining the intersection of the found regions associated with the selected values from each value array, and thereby identifying regions of the feature in which the specified first set of criteria are satisfied.

11. A method according to claim 10, for performing dynamic segmentation analysis on an identified region of a feature, wherein step (b) includes the step of repeating step (b)(i) by scanning a portion of the value arrays corresponding to the identified region in which the first set of search criteria are satisfied, for candidate values meeting a second set of search criteria, and repeating steps (b)(ii) and (b)(iii) to permit identifying regions of the feature in which the specified first and second sets of search criteria are both satisfied.

12. A method according to claim 9, wherein each region is described by a segment along the feature and the coordinates identifying the segment are normalized.

13. A method according to claim 10, wherein each region is described by a segment along the feature and the coordinates identifying the segment are normalized.

14. A computer-implemented method for performing dynamic segmentation analysis of a linear network, the method comprising:
   (a) providing a plurality of attribute value arrays of variable length, implemented in storage in a digital computer, each consecutive value in the array associated with a value of an attribute at a consecutive region of a feature;
   (b) providing a plurality of corresponding location arrays of variable lengths, implemented in storage in a digital computer, each location array associated with a given attribute value array and providing region coordinates for each successive value in the corresponding value array;
   (c) filling the arrays with data;
   (d) scanning the value arrays for candidate values meeting a specified first set of search criteria and selecting such values;

(e) finding the regions, specified in region coordinates in each of the related location arrays corresponding to the values selected;

(f) determining the intersection of the found regions associated with the selected values from each value array, and thereby identifying regions of the feature in which the specified first set of criteria are satisfied; and (g) providing an output of the determination in step (f).

15. A method according to claim 21, for performing dynamic segmentation analysis on an identified region of a feature, further comprising:

(h) repeating step (d) by scanning a portion of the value arrays corresponding to the identified region in which the first set of search criteria are satisfied, for candidate values meeting a second set of search criteria, and repeating steps (e) and (f) to permit identifying regions of the feature in which the specified first and second sets of search criteria are both satisfied.

16. A method according to claim 15, wherein each region is described by a segment along the feature and the coordinates identifying the segment are normalized.

* * * * *